(12) United States Patent
Komanduri et al.

(10) Patent No.: US 11,941,881 B2
(45) Date of Patent: Mar. 26, 2024

(54) METHOD AND SYSTEM FOR PUPIL SEPARATION IN A DIFFRACTIVE EYEPIECE WAVEGUIDE DISPLAY

(71) Applicant: Magic Leap, Inc., Plantation, FL (US)

(72) Inventors: Ravi Kumar Komanduri, Austin, TX (US); Chulwoo Oh, Cedar Park, TX (US); Kevin Messer, Mountain View, CA (US); Ioannis Papadopoulos, Lausanne (CH)

(73) Assignee: Magic Leap, Inc., Plantation, FL (US)

( * ) Notice: Subject to any disclaimer, the term of this patent is extended or adjusted under 35 U.S.C. 154(b) by 310 days.

(21) Appl. No.: 17/320,090

(22) Filed: May 13, 2021

(65) Prior Publication Data
US 2021/0356747 A1 Nov. 18, 2021

Related U.S. Application Data

(60) Provisional application No. 63/024,858, filed on May 14, 2020.

(51) Int. Cl.
*G06V 20/20* (2022.01)
*G02B 27/01* (2006.01)
(Continued)

(52) U.S. Cl.
CPC ......... *G06V 20/20* (2022.01); *G02B 27/0172* (2013.01); *G06F 18/10* (2023.01);
(Continued)

(58) Field of Classification Search
CPC ........ G02B 27/1013; G02B 2027/0114; G06F 18/10
See application file for complete search history.

(56) References Cited

U.S. PATENT DOCUMENTS

| 6,320,696 | B1 | 11/2001 | Greenberg et al. |
| 2006/0164857 | A1 | 7/2006 | Morejon et al. |

(Continued)

FOREIGN PATENT DOCUMENTS

GB 2571389 A 8/2019

OTHER PUBLICATIONS

Application No. PCT/US2021/032328, International Search Report and Written Opinion, dated Sep. 14, 2021, 10 pages.
(Continued)

*Primary Examiner* — Paul C Lee
(74) *Attorney, Agent, or Firm* — KILPATRICK TOWNSEND & STOCKTON LLP

(57) ABSTRACT

A pupil separation system includes an input surface, a central portion including a set of dichroic mirrors, a first reflective surface disposed laterally with respect to the central portion, and a second reflective surface disposed laterally with respect to the central portion. The pupil separation system also includes an exit face including a central surface operable to transmit light in a first wavelength range, a first peripheral surface adjacent the central surface and operable to transmit light in a second wavelength range, and a second peripheral surface adjacent the central surface and opposite to the first peripheral surface. The second peripheral surface is operable to transmit light in a third wavelength range.

20 Claims, 12 Drawing Sheets

(51) Int. Cl.
*G06F 18/10* (2023.01)
*G06F 18/21* (2023.01)
*G06F 18/22* (2023.01)
*G06N 20/00* (2019.01)
*G06T 3/00* (2006.01)
*G06V 20/62* (2022.01)

(52) U.S. Cl.
CPC ............ *G06F 18/217* (2023.01); *G06F 18/22* (2023.01); *G06N 20/00* (2019.01); *G06T 3/0093* (2013.01); *G06V 20/62* (2022.01); *G02B 2027/0114* (2013.01); *G02B 2027/0134* (2013.01)

(56) References Cited

U.S. PATENT DOCUMENTS

| | | |
|---|---|---|
| 2016/0041387 A1 | 2/2016 | Valera et al. |
| 2016/0334624 A1* | 11/2016 | Zhao ........................ G02B 6/00 |
| 2017/0248790 A1 | 8/2017 | Cheng |
| 2017/0315360 A1 | 11/2017 | Takeda |
| 2018/0120559 A1* | 5/2018 | Yeoh .................... G02B 6/0038 |
| 2018/0267309 A1 | 9/2018 | Klug et al. |
| 2020/0026083 A1 | 1/2020 | Yamamoto |

OTHER PUBLICATIONS

Application No. PCT/US2021/032328, "International Preliminary Report on Patentability", dated Nov. 24, 2022, 9 pages.
EP21805212.4, "Extended European Search Report", dated Nov. 6, 2023, 11 pages.

* cited by examiner

METHOD AND SYSTEM FOR PUPIL SEPARATION IN A DIFFRACTIVE EYEPIECE WAVEGUIDE DISPLAY

CROSS-REFERENCES TO RELATED APPLICATIONS

This application claims the benefit of priority to U.S. Provisional Patent Application No. 63/024,858, filed May 14, 2020, entitled "Method and System for Pupil Separation in a Diffractive Eyepiece Waveguide Display," the disclosure of which is hereby incorporated by reference in its entirety for all purposes.

BACKGROUND OF THE INVENTION

Modern computing and display technologies have facilitated the development of systems for so-called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems for waveguide displays. More particularly, embodiments of the present invention provide methods and systems that provide pupil separation systems that can be integrated with a waveguide display, also referred to as an eyepiece waveguide. The invention is applicable to a variety of applications in computer vision and image display systems.

As described herein, embodiments of the present invention relate to methods and systems to spatially separate light into a plurality of primary colors (e.g., the three primary colors of red, green, and blue) reflected from a scanning mirror and direct the spatially separated light beams to corresponding incoupling gratings, also referred to as incoupling grating regions, on diffractive eyepieces forming part of an augmented reality display device.

According to an embodiment of the present invention, a pupil separation system is provided. The pupil separation system includes an input surface, a central portion including a set of dichroic mirrors, a first reflective surface disposed laterally with respect to the central portion, a second reflective surface disposed laterally with respect to the central portion, and an output surface. The output surface includes a central surface operable to transmit light in a first wavelength range, a first peripheral surface adjacent the central surface and operable to transmit light in a second wavelength range, and a second peripheral surface adjacent the central surface and opposite to the first peripheral surface. The second peripheral surface is operable to transmit light in a third wavelength range.

According to another embodiment, an optical system is provided. The optical system includes a scanning mirror operable to rotate around an axis and a pupil separation system. The pupil separation system includes an input surface, a central portion including a set of dichroic mirrors, a first reflective surface disposed laterally with respect to the central portion, a second reflective surface disposed laterally with respect to the central portion, and an output surface. The output surface includes a central surface operable to transmit light in a first wavelength range, a first peripheral surface adjacent the central surface and operable to transmit light in a second wavelength range, and a second peripheral surface adjacent the central surface and opposite to the first peripheral surface. The second peripheral surface is operable to transmit light in a third wavelength range. The optical system further includes an eyepiece waveguide including a first waveguide layer including a first incoupling grating (ICG) corresponding to the first wavelength range, a second waveguide layer including a second ICG corresponding to the second wavelength range, wherein the second ICG is spatially offset from the first ICG, and a third waveguide layer including a third ICG corresponding to the third wavelength range. The third ICG is spatially offset from the first ICG and the second ICG.

According to a particular embodiment of the present invention, a method of operating a projector including a scanning mirror and an eyepiece waveguide is provided. The method includes receiving image light at the scanning mirror. The image light is characterized by a first wavelength range, a second wavelength range, and a third wavelength range. The method also includes rotating the scanning mirror around an axis, scanning the received image light along a first direction orthogonal to the axis, receiving the scanned image light at an input surface of a pupil separation system, and reflecting, from a first dichroic mirror of the pupil separation system, light in the first wavelength range. The method further includes reflecting, from a first peripheral surface of the pupil separation system, light in the first wavelength range; reflecting, from a second dichroic mirror of the pupil separation system, light in the second wavelength range; reflecting, from a second peripheral surface of the pupil separation system, light in the second wavelength range; and transmitting light in the third wavelength range.

In an embodiment, light in the first wavelength range is incident on an incoupling grating of a first waveguide layer of the eyepiece waveguide. Light in the second wavelength range can be incident on an incoupling grating of a second waveguide layer of the eyepiece waveguide and light in the third wavelength range can be incident on an incoupling grating of a third waveguide layer of the eyepiece waveguide. The method can also include filtering light in the first wavelength range using a first color filter coupled to the pupil separation system and/or filtering light in the second wavelength range using a second color filter coupled to the pupil separation system. Moreover, the method can include filtering light in the third wavelength range using a third color filter coupled to the pupil separation system. The first dichroic mirror and the second dichroic mirror can be orthogonal to each other and intersect, for example, along a line parallel to the axis.

Numerous benefits are achieved by way of the present invention over conventional techniques. For example, embodiments of the present invention provide methods and systems that provide for spatial separation between colors output by a scanned input light source so that spatially separated light beams can be directed to different positions on an eyepiece waveguide. These and other embodiments of the invention, along with many of its advantages and features, are described in more detail in conjunction with the text below and attached figures.

DETAILED DESCRIPTION OF SPECIFIC EMBODIMENTS

The present invention relates generally to methods and systems related to projection display systems, including wearable displays. More particularly, embodiments of the present invention provide methods and systems that provide pupil separation systems that can be integrated with a waveguide display, also referred to as an eyepiece waveguide. The invention is applicable to a variety of applications in computer vision and image display systems.

Micro-electromechanical System (MEMS) scanning mirrors are components that can be utilized with light sources, including laser diodes or light emitting diodes (LEDs), in compact, efficient projectors that are suitable for use in augmented reality applications. In some conventional designs, laser light in three primary colors (e.g., red, blue, and green) is collimated and combined using dichroic mirrors so that the combined beam can be scanned using a MEMS scanning mirror. In some implementations using a diffractive eyepiece waveguide, light from the MEMS scanning mirror is guided to in-coupling grating (ICG) regions on corresponding layers of the diffractive eyepiece waveguide, with each of the layers corresponding to one of the primary colors. In these implementations, transmissive in-line grating designs are utilized. However, the low efficiency of transmissive in-line grating designs may present challenges. Furthermore, potential issues associated with color cross talk between the layers of the diffractive eyepiece waveguide, lack of parallelism between the layers of the diffractive eyepiece, which may lead to production of ghost images, and the like can be present in these implementations.

According to embodiments of the present invention, one or more of the primary colors utilized in the display design are spatially separated and guided to separate ICG regions to mitigate design drawbacks associated with conventional techniques. Moreover, embodiments of the present invention enable the use of metallized ICGs, which may be blazed, in order to provide high grating efficiency.

Figure 1:
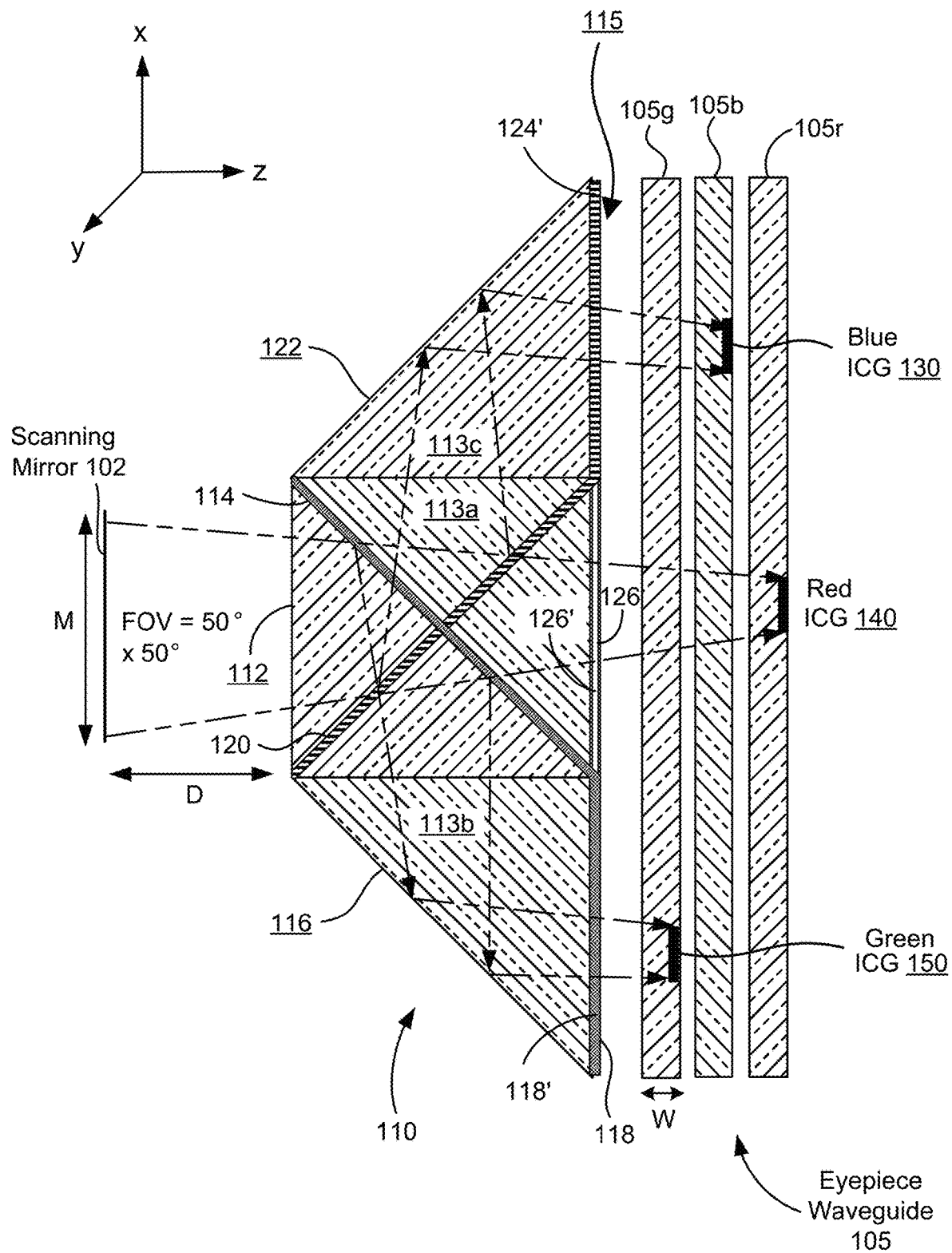
FIG. 1 is a simplified cross-sectional schematic diagram illustrating a pupil separation system for an eyepiece waveguide according to an embodiment of the present invention.

FIG. 1 is a simplified cross-sectional schematic diagram illustrating a pupil separation system for an eyepiece waveguide according to an embodiment of the present invention. As illustrated in FIG. 1, an eyepiece waveguide 105 is shown that includes three waveguide layers, each associated with a primary color. Thus, in this embodiment, the three waveguide layers include a green waveguide layer 105g, red waveguide layer 105r, and blue waveguide layer 105b. In other embodiments, more than three waveguide layers are utilized to increase the number of colors utilized in the display, to increase the number of depth planes, or the like. As will be evident to one of skill in the art, the waveguide layers of the eyepiece waveguide receive input light at an incoupling diffractive optical element that diffracts the received input light into the plane of the waveguide. In the embodiment illustrated in FIG. 1, each of the incoupling diffractive optical elements is implemented as an incoupling grating (ICG), although this particular diffractive structure is not required by the present invention and other diffractive structures including a variety of diffractive optical elements can be utilized and are included within the scope of the present disclosure. As illustrated in FIG. 1, green waveguide layer 105g includes green ICG 150, red waveguide layer 105r includes red ICG 140, and blue waveguide layer 105b includes blue ICG 130. After propagation in the waveguide layer, the light is subsequently outcoupled toward the eye of a user, for example, by using an exit pupil expander (EPE) (not shown) or other suitable diffractive outcoupling element. Utilizing three primary colors, a multi-color display can be assembled using the three waveguide layers shown in FIG. 1. In the embodiment illustrated in FIG. 1, the index of refraction of the eyepiece waveguide is 1.75.

In the eyepiece waveguide illustrated in FIG. 1, each of the ICGs is spatially separated from the other ICGs. Using the coordinate axis illustrated in FIG. 1, light propagates toward the eyepiece waveguide in a longitudinal direction aligned with the z-axis. The lateral plane defined by the x-y plane extends into the plane of the figure as well as out of the plane of the figure. The ICGs are spatially offset from each other in this lateral plane. As shown in FIG. 1, blue ICG 130 is positioned to cover a first range of positions in the x-y plane, red ICG 140 is positioned to cover a second range of positions in the x-y plane, and green ICG 150 is positioned to cover a third range of positions in the x-y plane. These ranges do not overlap, forming spatially separated and distinct pupils for each of the waveguide layers. This architecture utilizing spatially separated and distinct pupils can be referred to as a sub-pupil design.

In some projector designs, a scanning mirror is utilized to scan light, including all three primary colors (e.g., RGB light), that is image-wise modulated. Thus, as light impinges on the scanning mirror, all three colors are present at a predetermined intensity as appropriate for a particular pixel. As described herein, pupil separation is utilized to spectrally and spatially separate the primary colors to provide spatially separated inputs, also referred to as pupils, for different waveguide layers.

Figure 2:
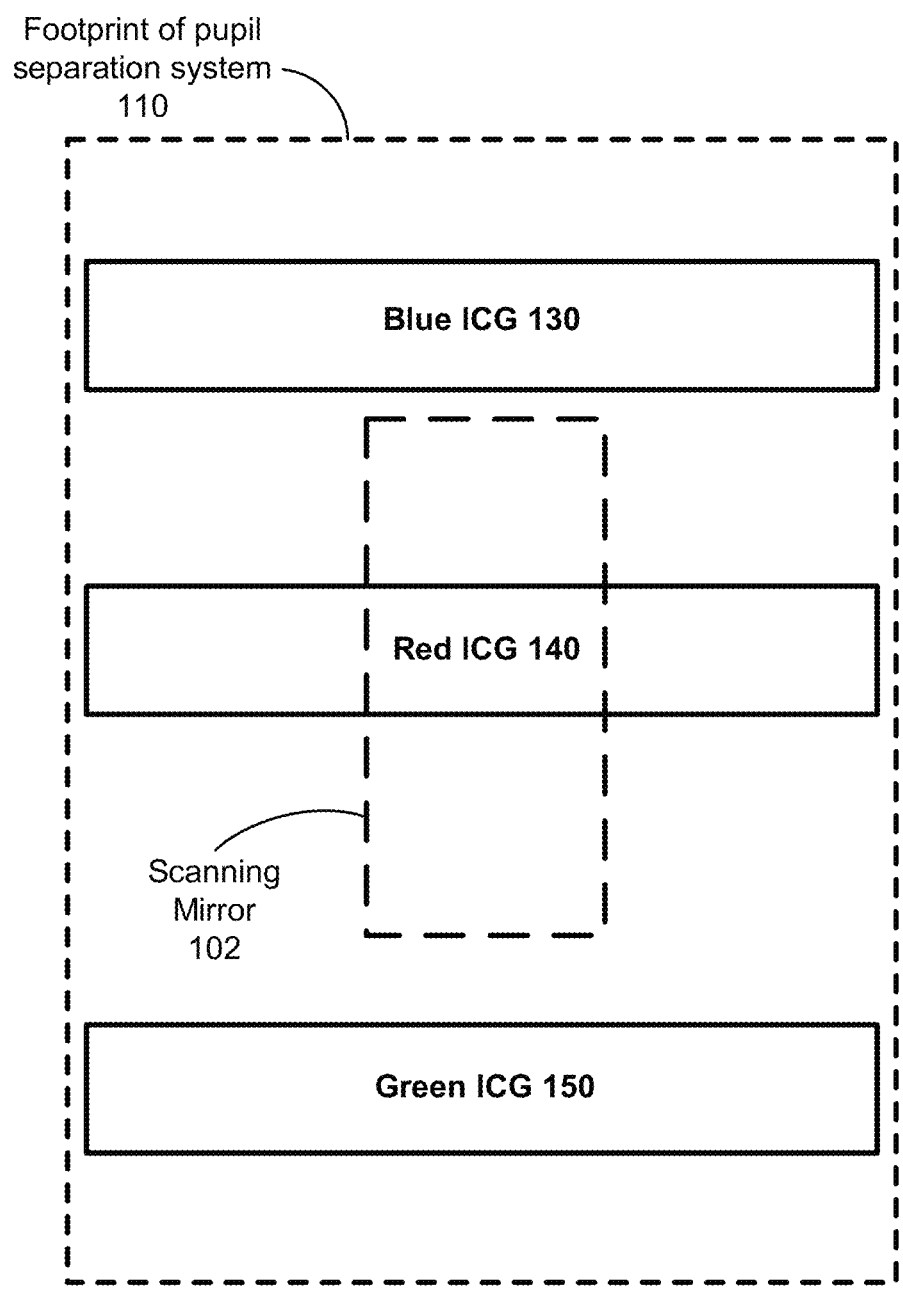
FIG. 2 is a simplified plan view of the pupil separation system illustrated in FIG. 1.
Figure 2:
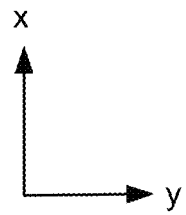

In FIG. 1, a scanning mirror that reflects light with a converging profile in at least one dimension and characterized by a predetermined Field of View (FOV), for example, 50°×50°, is illustrated. Without limiting embodiments of the present invention, example dimensions for scanning mirror 102 can be on the order of ~4.6 mm×1.5 mm as shown. This mirror creates the FOV in the y direction. For purposes of clarity, other projection optics are not shown, but it will be appreciated that suitable projection optics will be utilized through which light travels prior to reaching scanning mirror 102 in order to form a pupil. As measured along the x-axis, the beam is converging as shown and creates a pupil, which is generally disposed at a predetermined longitudinal position inside eyepiece waveguide 105. It is assumed that the in-coupling diffraction direction inside the waveguide is along the x-direction, and it is beneficial to minimize the size of the pupil along this direction to minimize what are known as re-bounce losses within the waveguide. As an example, for a 500 μm thick waveguide with an index of refraction of 1.75 and an FOV of 50°×50°, this dimension may be about 1.3 mm. In a particular embodiment, the pupil is disposed at a longitudinal position aligned with red ICG 140, although this is not required by the present invention. As measured along the y-axis, the beam is diverging, thereby providing a pupil with an oblong geometry as illustrated in FIG. 2. In other embodiments, other scanning projector architectures can be utilized, for example, scanning fiber projectors, and the like.

Referring to FIG. 1, scanning mirror 102 rotates around the x-axis and oscillates in a manner to scan the input light along the y-axis, i.e., directions orthogonal to the plane of the figure. The FOV in the x-direction and along the plane of the figure is created by a second scanning mirror (not shown) located upstream in the optical path, for example, via an Offner relay type arrangement. Thus, using this set of scanning mirrors, the projector creates an FOV disposed in the x-y plane, extending both in the plane of the figure (i.e., the x-direction) as well as orthogonal to the plane of the figure (i.e., the y-direction).

Light from scanning mirror 102 is illustrated as entering pupil separation system 110 at input surface 112. In some embodiments, input surface 112, which can be referred to as an entrance face, is antireflection coated to maintain low reflection over the FOV and for all colors. Pupil separation system 110 includes a central portion 113a that includes two crossed dichroic mirrors oriented at ±45° with respect to the direction of propagation of the incident light chief ray. Referring to FIG. 1, a set of dichroic mirrors (i.e., first dichroic mirror 114 and second dichroic mirror 120) are both oriented at 45° to input surface 112; in particular, first dichroic mirror 114 is oriented at +45° to input surface 112 and second dichroic mirror 120 is oriented at −45° to input surface 112.

As illustrated in FIG. 1, first dichroic mirror 114 reflects green wavelengths while transmitting red wavelengths and blue wavelengths. Second dichroic mirror 120 reflects blue wavelengths while transmitting red wavelengths and green wavelengths. As illustrated in FIG. 1, first dichroic mirror 114 and second dichroic mirror 120 are orthogonal to each other and intersect at a line parallel to the y-axis and input surface 112.

Thus, first dichroic mirror 114 and second dichroic mirror 120 are highly reflective for one of the three primary colors and highly transmissive for the other two primary colors over the FOV. Since red wavelengths (e.g., ~570 nm-700 nm) are transmitted by both first dichroic mirror 114 and second dichroic mirror 120, light in these wavelengths propagates toward red color filter 126 and red ICG 140. Red color filter 126 is disposed on a central surface 126' that is laterally surrounded by two adjacent peripheral surfaces, described more fully below, and is operable to transmit light in the red wavelength range. Thus, light in the red wavelength range converges at the location of red ICG 140, which corresponds to the diffractive incoupling element for red waveguide layer 105r.

In the pupil separation system illustrated in FIG. 1, a material with a reasonably high refractive index (n>2.0) is utilized to produce an angular separation between light at the various wavelengths significantly less than the angular separation that these wavelengths would experience in air. As will be evident to one of skill in the art, this is beneficial in maintaining a small spatial separation between the colors, which is advantageous in order to provide a compact eyepiece waveguide. Additional discussion related to the index of refraction of the pupil separation system is provided in relation to FIGS. 3 and 4. In the embodiment illustrated in FIG. 1, the overall active dimensions of pupil separation system 110 are ~2.5 mm×6 mm×5 mm, which enable use in a variety of compact architectures.

Referring once again to FIG. 1, green wavelengths (e.g., ~500 nm-570 nm) are reflected from first dichroic mirror 114 and propagate toward surface 116, which is formed by the interface between the material of the pupil separation system 110 and the surrounding environment, which is typically air. Surface 116 is formed on one surface of first peripheral portion 113b laterally adjacent central portion 113a. Surface 116 can be referred to as a first reflective surface. Because of the index of refraction difference at surface 116 between the material of first peripheral portion 113b and the surrounding environment, light at green wavelengths is reflected via Total Internal Reflection (TIR) and propagates toward green color filter 118 and green ICG 150 disposed in green waveguide layer 105g. Green color filter 118 is disposed on a first peripheral surface 118' adjacent the central surface 126' and is operable to transmit light in the green wavelength range.

Similarly, blue wavelengths (e.g., ~400 nm-500 nm) are reflected from second dichroic mirror 120 and propagate toward surface 122, which is formed by the interface between the material of the pupil separation system 110 and the surrounding environment, which is typically air. Surface 122 is formed on one surface of second peripheral portion 113c laterally adjacent central portion 113a. Surface 120 can be referred to as a second reflective surface. Because of the index of refraction difference at surface 122 between the material of second peripheral portion 113c and the surrounding environment, light at blue wavelengths is reflected via TIR and propagates toward blue color filter 124 and blue ICG 130 disposed in blue waveguide layer 105b. Blue color filter 124 is disposed on a second peripheral surface 124' adjacent the central surface 126' and is operable to transmit light in the blue wavelength range. As shown in FIG. 1, the first reflective surface (i.e., surface 116) can be oriented at 45° to input surface 112 and the second reflective surface (i.e., surface 120) can be oriented at −45° to input surface 112.

Thus, output surface 115 includes central surface 126' operable to transmit light in a first wavelength range (e.g., the red wavelength range), first peripheral surface 118' laterally adjacent central surface 126' and operable to transmit light in a second wavelength range (e.g., the green wavelength range), and second peripheral surface 124' laterally adjacent central surface 126' and opposite to first peripheral surface 118', that is, disposed on the opposite side of central surface 126' with respect to first peripheral surface 118'. Second peripheral surface 124' is operable to transmit light in a third wavelength range (e.g., the blue wavelength range).

Although TIR is utilized at surfaces 116 and 122 in the embodiment illustrated in FIG. 1, this is not required by the present invention and, alternatively, surfaces 116 and 122 could be coated with a reflective material (e.g., aluminum, silver, or the like), thereby forming a reflective coating, in order to provide high reflectivity surfaces, in case the TIR condition is not satisfied. The reflective coating can be disposed on the first reflective surface (i.e., surface 116) and the second reflective surface (i.e., surface 120). The distance between scanning mirror 102 and pupil separation system 110 (e.g., D=1.1 mm), the thickness of pupil separation system 110 along the z-axis (e.g., 2.5 mm), propagation distances within pupil separation system 110, the distance between pupil separation system 110 and eyepiece waveguide 105, the index of refraction of pupil separation system 110, including potential differences in the index of refraction in different portions of pupil separation system 110, the lateral spacing between the ICGs, the thickness of green waveguide layer 105g, red waveguide layer 105r, and blue waveguide layer 105b (e.g., W=0.5 mm), the spacing between green waveguide layer 105g, red waveguide layer 105r, and blue waveguide layer 105b (e.g., 50 µm), and the like are parameters that can be optimized based on the specific application. In some embodiments, it is preferable to utilize small distances between the ICGs in the x-direction measured along the waveguide (e.g., 2.5 mm), which results in a design having a small lateral size for the converging beam at the locations of the ICGs.

As illustrated in FIG. 1, color filters (e.g., three color filters) can be deposited on or otherwise optically coupled to the surface of pupil separation system 110 adjacent eyepiece waveguide 105, which can be referred to as an output surface 115, an exit surface, or an exit face. For example, green color filter 118 can be positioned on the surface of pupil separation system 110 adjacent eyepiece waveguide 105 (i.e., output surface 115) to transmit light with green wavelengths and attenuate or block light outside the green wavelength band (i.e., red and blue wavelengths). Similarly, red color filter 126 can be positioned on the surface of pupil separation system 110 adjacent eyepiece waveguide 105 (i.e., output surface 115) to transmit light with red wavelengths and attenuate or block light outside the red wavelength band (i.e., green and blue wavelengths). Finally, blue color filter 124 can be positioned on the surface of pupil separation system 110 adjacent eyepiece waveguide 105 (i.e., output surface 115) to transmit light with blue wavelengths and attenuate or block light outside the blue wavelength band (i.e., red and green wavelengths). Thus, in addition to spectral separation achieved using first dichroic mirror 114 and second dichroic mirror 120, the use of color filters, for example, green color filter 118, red color filter 126, and blue color filter 124, can be implemented to reduce cross-talk between the ICGs that can result from spurious reflections at the dichroic mirrors, reflection from interfaces, including surfaces of the waveguide layers, reflection from the ICGs, and the like.

Utilizing the pupil separation system illustrated in FIG. 1, reflective ICGs can be utilized, which are characterized by high efficiency and low optical loss. In some embodiments, metallized ICGs can be utilized since the light incident on the ICG has been spectrally separated and cross-talk between ICGs is, therefore, reduced.

Although eyepiece waveguide 105 includes three waveguide layers (i.e., green waveguide layer 105g, red waveguide layer 105r, and blue waveguide layer 105b) in the embodiment illustrated in FIG. 1, other embodiments utilize an eyepiece waveguide that includes six waveguide layers and is operable to support two depth planes. As an example, two sources of image light could be utilized and directed to the scanning mirror in a time multiplexed manner. During a first time interval, image light associated with the first depth plane could be directed to scanning mirror 102 and the three ICGs illustrated in FIG. 1. During the second time interval, image light associated with the second depth plane could be directed to the scanning mirror at an offset angle, resulting in light in each of the three wavelength bands being directed to a second set of ICGs (not shown) that are slightly spatially offset along the x-axis, for example, slightly above the illustrated ICGs. Thus, two depth plane implementations are included within the scope of the present invention.

FIG. 2 is a simplified plan view of the pupil separation system illustrated in FIG. 1. As illustrated in FIG. 2, the footprint of pupil separation system 110 and that of scanning mirror 102 are shown in comparison to the lateral dimensions of blue ICG 130, red ICG 140, and green ICG 150. As an example, the pupil separation system can have dimensions of 9 mm×5 mm×2.5 mm and the scanning mirror can have dimensions of ~4.6 mm×1.5 mm as shown. In a particular embodiment, blue ICG 130 has dimensions of 1.3 mm measured in the x-direction and 4.6 mm measured in the y-direction, red ICG 140 has dimensions of 1.3 mm measured in the x-direction and 4.0 mm measured in the y-direction, and green ICG 150 has dimensions of 1.3 mm measured in the x-direction and 4.5 mm measured in the y-direction. Thus, considered in the longitudinal direction orthogonal to the plane of the figure, the dimensions of the ICGs can vary as appropriate to the particular application. One of ordinary skill in the art would recognize many variations, modifications, and alternatives.

Figure 3:
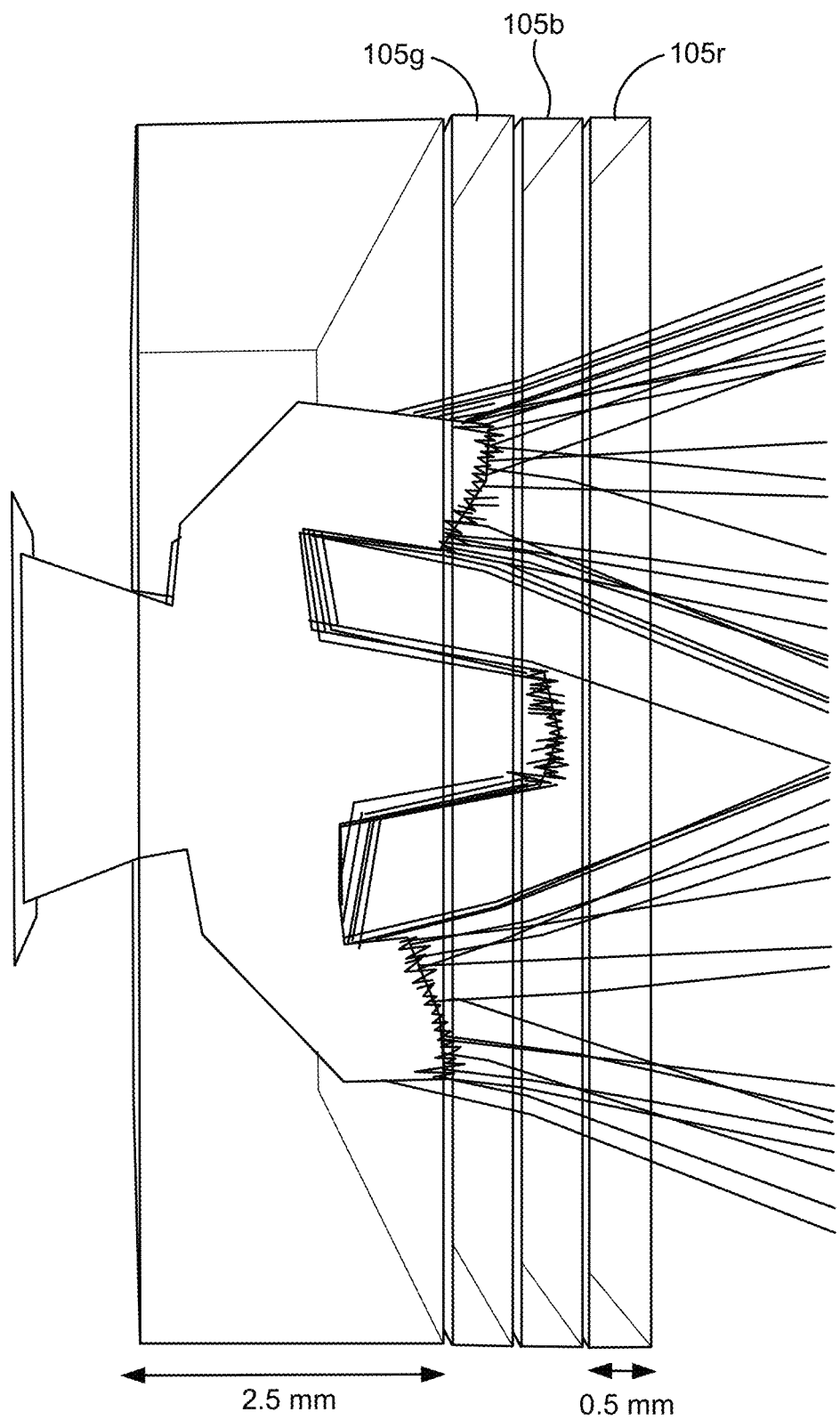
FIG. 3 is a simulation result demonstrating operation of the pupil separation system illustrated in FIG. 1 fabricated using a first material.

FIG. 3 is a simulation result demonstrating operation of the pupil separation system illustrated in FIG. 1 fabricated using a first material. In this simulation, the index of refraction of pupil separation system 110 is 2.0 and the leakage/uncaptured percentage of the light at the ICGs is ~2.7%. As shown in FIG. 3, uncaptured light for red ICG 140 is significantly less than the uncaptured light for blue ICG 130 and green ICG 150 as indicated by the light rays propagating to the right through the eyepiece waveguide. For this simulation, ideal AR coatings are applied where appropriate, ideal dichroic mirrors and color filters are utilized, and material dispersion is not included. Differing from the lateral dimensions shown in FIG. 2, for purposes of this simulation, the ICG size in the lateral plane for each color is equal: 1.3 mm in the x-direction and 4 mm in the y-direction. In FIG. 3, green waveguide layer 105g, red waveguide layer 105r, and blue waveguide layer 105b are illustrated for ease of comparison with FIG. 1 and the ICGs are disposed on the surface of the waveguide layers farthest from pupil separation system 110. For this implementation, the distance from input surface 112 to the surface of pupil separation system 110 adjacent eyepiece waveguide 105 is 2.5 mm and the thickness of the waveguide layers is 0.5 mm, with a 50 µm space between adjacent waveguide layers. In other implementations, other dimensions are utilized.

Figure 4:
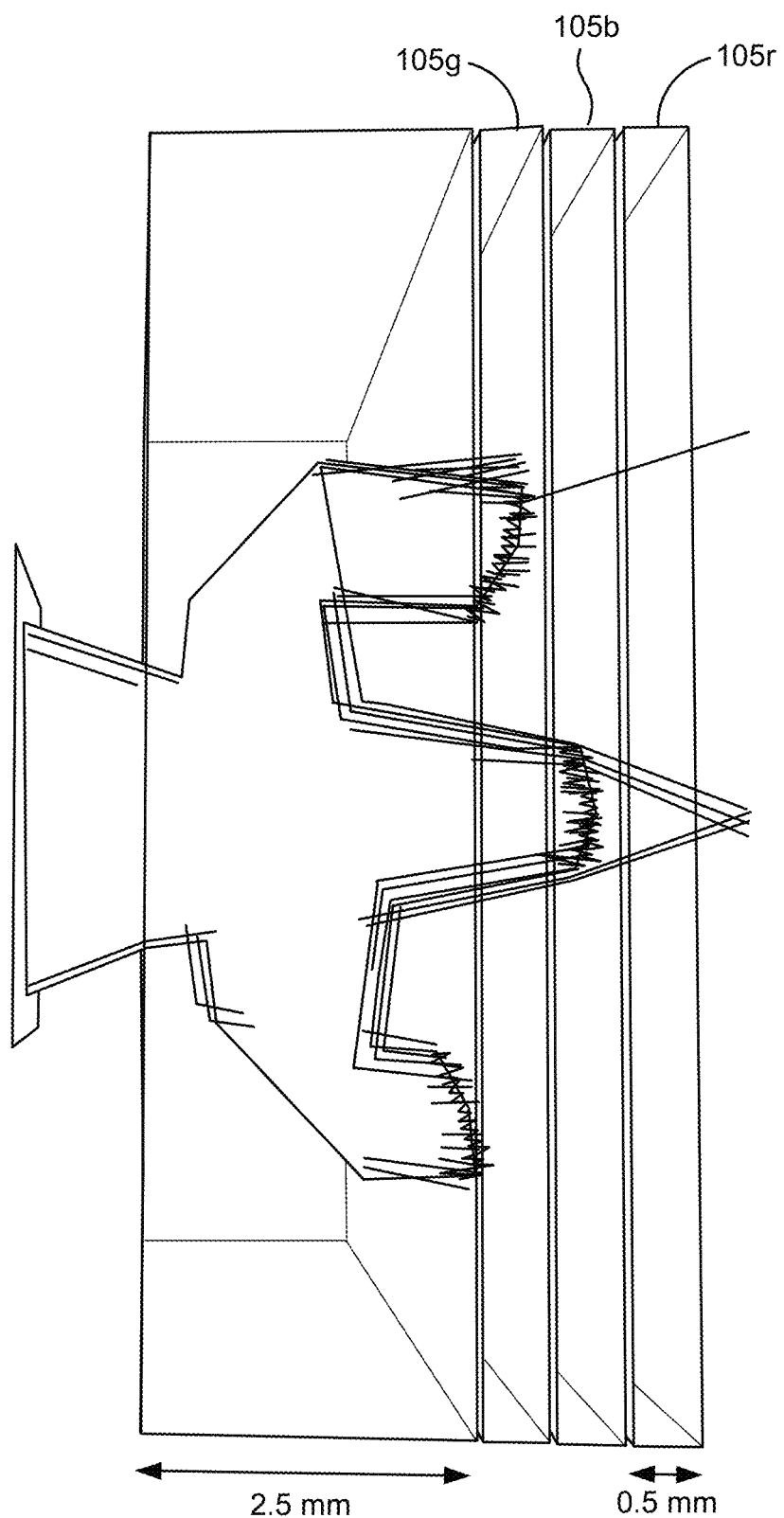
FIG. 4 is a simulation result demonstrating operation of the pupil separation system illustrated in FIG. 1 fabricated using a second material.

FIG. 4 is a simulation result demonstrating operation of the pupil separation system illustrated in FIG. 1 fabricated using a second material. In this simulation, the index of refraction of pupil separation system 110 is 2.5 and the leakage/uncaptured percentage of the light at the ICGs is ~0.7%. As shown in FIG. 4, uncaptured light for all three ICGs, red ICG 140, blue ICG 130, and green ICG 150, is significantly equal and reduced in comparison to FIG. 3 as indicated by the reduced number of light rays propagating to the right through the eyepiece waveguide. For this simulation, ideal AR coatings are applied where appropriate, ideal dichroic mirrors and color filters are utilized, and material dispersion is not included. Differing from the lateral dimensions shown in FIG. 2, for purposes of this simulation, the ICG size in the lateral plane for each color is equal: 1.3 mm in the x-direction and 4 mm in the y-direction. In FIG. 4, green waveguide layer 105g, red waveguide layer 105r, and blue waveguide layer 105b are illustrated for ease of comparison with FIG. 1 and the ICGs are disposed on the surface of the waveguide layers farthest from pupil separation system 110. For this implementation, the distance from input surface 112 to the surface of pupil separation system 110 adjacent eyepiece waveguide 105 is 2.5 mm and the thickness of the waveguide layers is 0.5 mm, with a 50 µm space between adjacent waveguide layers. In other implementations, other dimensions are utilized.

Comparing FIG. 3 and FIG. 4, it is evident that the percentage of uncaptured light (i.e., leakage) by the ICGs is measured and has decreased from ~2.7% (FIG. 3) to ~0.7% (FIG. 4). The inventors have determined that both of these percentages are acceptable for a wide range of applications. In both simulations, the index of refraction is greater than or equal to 2.0, which results in large optical path lengths inside the pupil separation system, enabling focusing of light to a small area at the ICG, which increases optical efficiency. In other words, the use of the pupil separation system enables the working distance to be extended using high index of refraction optics that results in spatial separation of the pupils at the eyepiece waveguide. As will be evident to one of skill in the art, increasing the optical path length, which is the product of propagation distance and index of refraction, by increasing the index of refraction enables more compact pupil separation system designs with decreased propagation distance. It should be noted that although dispersion was not included in the simulations shown in FIGS. 3 and 4, for many optical materials, the dispersion decreases with increasing wavelength, resulting in a higher index of refraction at shorter wavelengths. As a result, light in the blue and green wavelength ranges will experience a higher index of refraction in comparison with light in the red wavelength range, enabling longer optical path lengths for blue and green wavelengths, further reducing the percentage of uncaptured light.

Referring once again to FIG. 1, the inventors have determined that the longitudinal positions of the ICGs can be selected based on the impact of the index of refraction values. As shown in FIG. 1, blue ICG 130 is positioned at an intermediate longitudinal position, with green ICG 150 closest to pupil separation system 110 and red ICG 140 farthest from pupil separation system 110. This arrangement utilizes the fact that blue wavelengths should experience a higher index of refraction due to dispersion in comparison with green wavelengths. The path length from pupil separation system 110 to red ICG 140 is the shortest and, in order to form a small pupil at the location of red ICG 140, light with red wavelengths is routed as shown. Since light with blue wavelengths will have a higher index of refraction, this light has a longer path length than green and, accordingly, blue ICG 130 is positioned farther from pupil separation system 110 in comparison to green ICG 150 in order to form small pupils for both blue and green wavelengths. In other embodiments, green ICG 150 is positioned at an intermediate longitudinal position, with blue ICG 130 closest to pupil separation system 110 and red ICG 140 farthest from pupil separation system 110. Moreover, in some embodiments, red ICG 140 is closest to pupil separation system 110 with green ICG 150 and blue ICG 130 positioned at either an intermediate longitudinal position or the farthest longitudinal position. One of ordinary skill in the art would recognize many variations, modifications, and alternatives.

Figure 5:
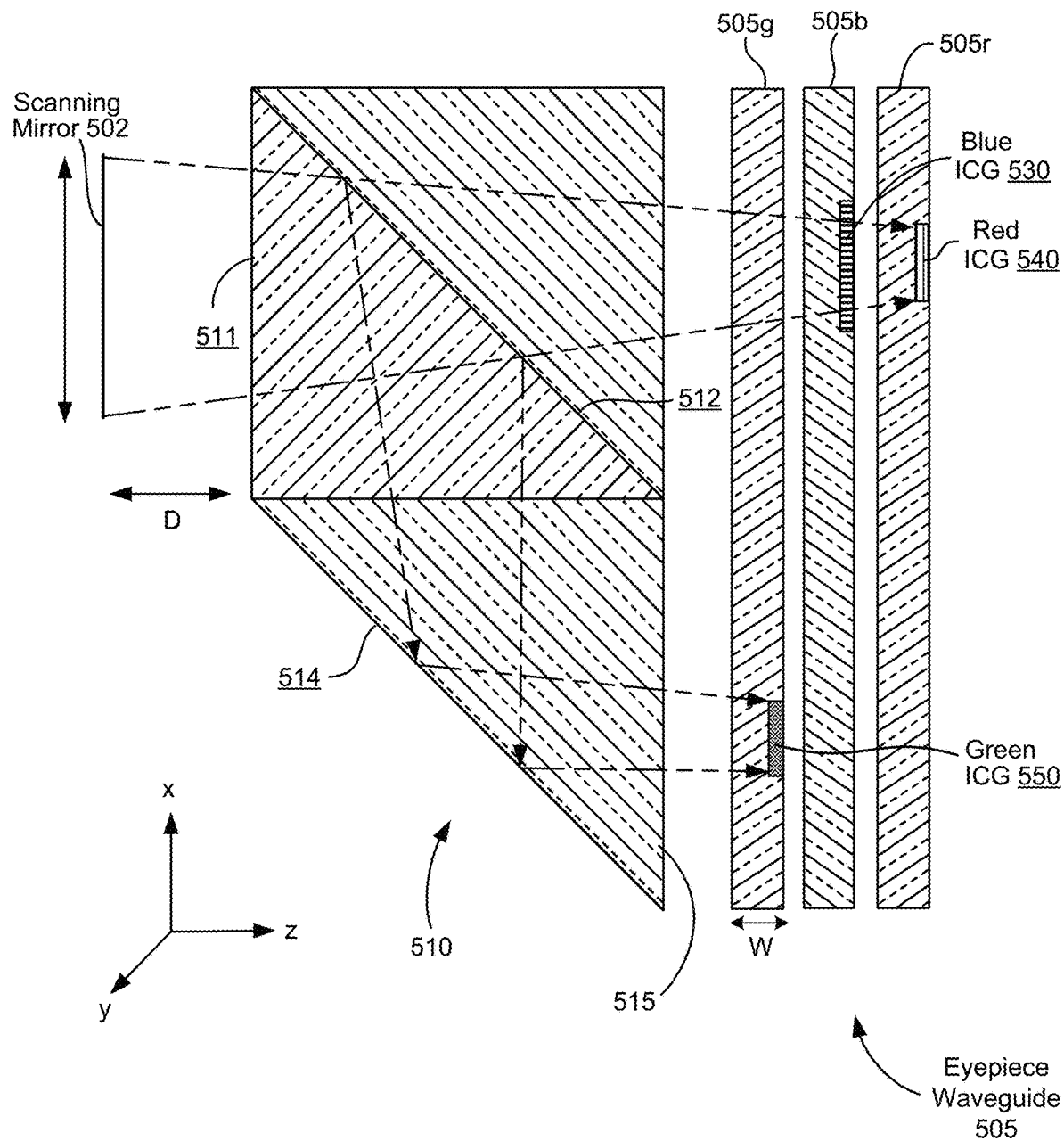
FIG. 5 is a simplified cross-sectional schematic diagram illustrating a pupil separation system for an eyepiece waveguide according to another embodiment of the present invention.

FIG. 5 is a simplified cross-sectional schematic diagram illustrating a pupil separation system for an eyepiece waveguide according to another embodiment of the present invention. The pupil separation system illustrated in FIG. 5 shares some common elements with the pupil separation system shown in FIG. 1 and the discussion provided in relation to FIG. 1 is applicable to FIG. 5 as appropriate. In contrast with the pupil separation system illustrated in FIG. 1, the ICGs shown in FIG. 5 share some overlap between some ICGs as well as being offset with respect to other ICGs. As shown in FIG. 5, blue ICG 530 is positioned to cover a first range of positions in the x-y plane and red ICG 540 is positioned to cover a subset of the first range of positions in the x-y plane. In other embodiments, red ICG 540 can have a spatial extent in the lateral plane (i.e., the x-y plane) that is larger than blue ICG 530. Additionally, in some embodiments, blue ICG 530 and red ICG 540 share some overlap, but also include portions that are distinct from portions of the other ICG. Green ICG 550 is positioned to cover a second range of positions in the x-y plane that does not overlap with the first range of positions, thereby, forming pupils for blue waveguide layer 505b and red waveguide layer 505r that are spatially overlapped and a pupil for green waveguide layer 505g that is spatially separated and distinct from blue waveguide layer 505b and red waveguide layer 505r. Thus, this sub-pupil design includes both spatially overlapped and spatially separated and distinct pupils, as measured in the lateral (i.e., the x-y) plane.

In a manner similar to the pupil separation system discussed in relation to FIG. 1, scanning mirror 502 reflects light with a converging profile and characterized by a predetermined Field of View (FOV), for example, 50°×50°. Without limiting embodiments of the present invention, example dimensions for scanning mirror 502 can be on the order of ~4.6 mm square. For purposes of clarity, other projection optics are not shown, but it will be appreciated that suitable projection optics will be utilized through which light travels prior to reaching scanning mirror 502 in order to form a pupil. As measured along the x-axis, the beam is converging as shown and creates a pupil, which is generally disposed at a predetermined longitudinal position inside eyepiece waveguide 505. In a particular embodiment, the pupil is disposed at a longitudinal position aligned with red ICG 540, although this is not required by the present invention. As measured along the y-axis, the beam is diverging, thereby providing a pupil with an oblong geometry as illustrated in FIG. 2. In other embodiments, other scanning projector architectures can be utilized, for example, scanning fiber projectors, and the like.

Referring to FIG. 5, scanning mirror 502 rotates around the x-axis and oscillates in a manner to scan the input light along the y-axis, i.e., directions orthogonal to the plane of the figure. The FOV in the x-direction and along the plane of the figure is created by a second scanning mirror (not shown) located upstream in the optical path, for example, via an Offner relay type arrangement. Thus, using this set of scanning mirrors, the projector creates an FOV disposed in the x-y plane, extending both in the plane of the figure (i.e., the x-direction) as well as orthogonal to the plane of the figure (i.e., the y-direction).

Light from scanning mirror 502 is illustrated as entering pupil separation system 510 at input surface 511. In some embodiments, input surface 511 is antireflection coated to maintain low reflection over the FOV and for all colors. Pupil separation system 510 includes a central portion that includes a dichroic mirror oriented at ±45° with respect to the direction of propagation of the incident light chief ray. As illustrated in FIG. 5, dichroic mirror 512 reflects green wavelengths while transmitting red wavelengths and blue wavelengths. Thus, dichroic mirror 512 is highly reflective for green wavelengths and highly transmissive for the blue and red wavelengths over the FOV. Since blue and red wavelengths are transmitted by dichroic mirror 512, light in these wavelengths propagates toward blue ICG 530 and red ICG 540. Thus, light in the blue wavelength range converges at the location of blue ICG 530, which corresponds to the diffractive incoupling element for blue waveguide layer 505b, and light in the red wavelength range converges at the location of the red ICG 540, which corresponds to the diffractive incoupling element for red waveguide layer 505r.

Referring once again to FIG. 5, green wavelengths are reflected from dichroic mirror 512 and propagate toward surface 514, which is formed by the interface between the material of the pupil separation system 510 and the surrounding environment, which is typically air. Because of the index of refraction difference at surface 514, light at green wavelengths is reflected via TIR and propagates toward green ICG 550 disposed in green waveguide layer 505g.

Although TIR is utilized at surface 514 in the embodiment illustrated in FIG. 5, this is not required by the present invention and, alternatively, surface 514 could be coated with a reflective material (e.g., aluminum, silver, or the like) in order to provide a high reflectivity surface. The distance between scanning mirror 502 and pupil separation system 510 (e.g., D=1.1 mm), the thickness of pupil separation system 510 along the z-axis, propagation distances within pupil separation system 510, the distance between pupil separation system 510 and eyepiece waveguide 505, the index of refraction of pupil separation system 510, including potential differences in the index of refraction in different portions of pupil separation system 510, the lateral spacing between the ICGs, the thickness of green waveguide layer 505g, red waveguide 505r, and blue waveguide 505b (e.g., W=0.5 mm), the spacing between green waveguide layer 505g, red waveguide 505r, and blue waveguide 505b, and the like are parameters that can be optimized based on the specific application. In some embodiments, it is preferable to utilize small distances between the ICGs in the x-direction measured along the waveguide (e.g., 2.5 mm), which results in a design having a small lateral size for the converging beam at the locations of the ICGs.

Although not illustrated in FIG. 5, color filters similar to those discussed in relation to FIG. 1 can be deposited on or otherwise optically coupled to the surface of pupil separation system 510 adjacent eyepiece waveguide 505. For example, a green color filter can be positioned on the surface of pupil separation system 510 adjacent eyepiece waveguide 505 and green ICG 550 to transmit light with green wavelengths and attenuate or block light outside the green wavelength band (i.e., red and blue wavelengths). Similarly, a notch filter that transmits blue and red wavelengths can be positioned on the surface of pupil separation system 510 adjacent eyepiece waveguide 505 and blue ICG 530 and red ICG 540 to transmit light with blue and red wavelengths and attenuate or block light between the blue and red wavelength bands (i.e., green wavelengths). Thus, in additional spectral separation achieved using dichroic mirror 512, the use of color filters can be implemented to reduce cross-talk between the ICGs that can result from spurious reflections at the dichroic mirror, reflection from interfaces including surfaces of the waveguide layers, reflection from the ICGs, and the like. In other embodiments, the waveguide layers include spectrally selective absorptive materials to perform the functions provided by the color filters; for example, green waveguide layer 505g can include a material that absorbs light at blue and red wavelengths. Similarly, absorptive material may also be utilized in conjunction with other waveguide layers.

In the implementation illustrated in FIG. 5, blue ICG 530 is a transmissive ICG that diffracts light in the blue wavelength range into blue waveguide layer 505b, while transmitting red wavelengths, and red ICG 540 and green ICG 550 are reflective ICGs. Due to the large wavelength difference between the blue wavelength range and the red wavelength range, the cross-talk between blue ICG 530 and red ICG 540 is low, or low enough to meet system requirements. As will be evident to one of skill in the art, the low cross-talk results from several sources. For example, if light at red wavelengths is diffracted into blue waveguide layer 505b, the angles at which these red wavelengths propagate in blue waveguide layer 505b are large enough that they do not propagate (e.g., do not experience TIR) or propagate with low efficiency. Additionally, in the embodiment illustrated in FIG. 5, dichroic mirror 512 is utilized to spectrally separate light in the green wavelength band; however, dichroic mirror 512 can be replaced by a polarization selective mirror that selectively redirects light at green wavelengths, which is characterized by a first polarization state, compared to light at blue and red wavelengths, which is characterized by a second polarization state, for example, orthogonal to the first polarization state. Thus, in addition to the use of a dichroic mirror based beam splitter, a polarizing beam splitter can be utilized. In these polarization-based devices, one or more additional polarization maintaining elements or polarization control elements can be integrated to provide the desired polarization state at the ICGs. One of ordinary skill in the art would recognize many variations, modifications, and alternatives.

In the pupil separation system illustrated in FIG. 5, a material with a reasonably high refractive index (n>2.0) is utilized to produce an angular separation between light at the various wavelengths significantly less than the angular separation that these wavelengths would experience in air. As example, a pupil separation system can be fabricated using glass having an index of refraction of 2.0, with overall active dimensions of ~2.5 mm×2.5 mm×5 mm. Alternatively, utilizing a glass having an index of refraction of 2.5, a pupil separation system with overall active dimensions of ~2.8 mm×2.8 mm×5.6 mm can be utilized.

Figure 6:
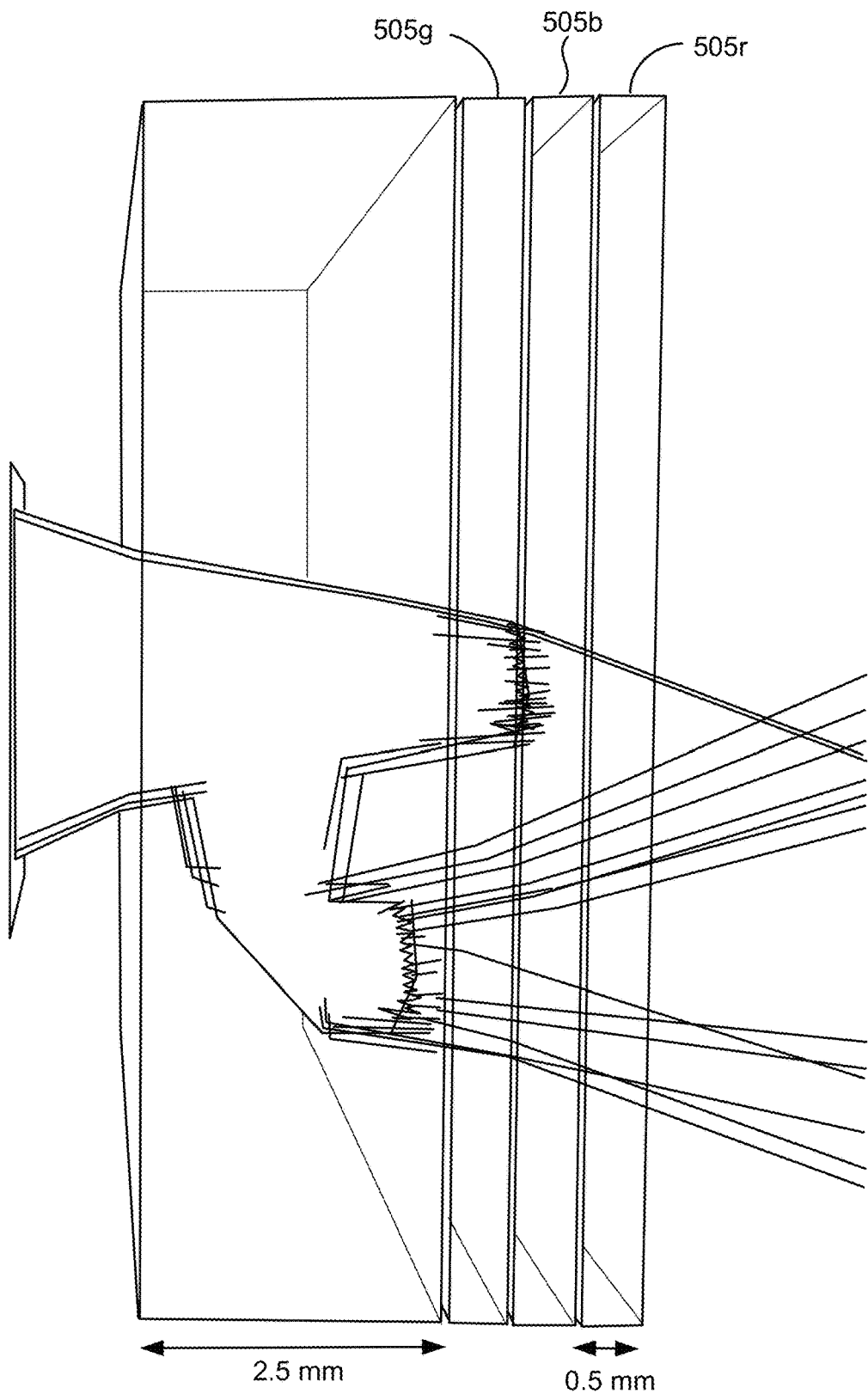
FIG. 6 is a simulation result demonstrating operation of the pupil separation system illustrated in FIG. 5 fabricated using a first material.

FIG. 6 is a simulation result demonstrating operation of the pupil separation system illustrated in FIG. 5 fabricated using a first material. In this simulation, the index of refraction of pupil separation system 510 is 2.0 and the leakage/uncaptured percentage of the light at the ICGs is ~2%. As shown in FIG. 6, uncaptured light for blue ICG 530 and red ICG 540 is significantly less than the uncaptured light for green ICG 550 as indicated by the light rays propagating to the right through the eyepiece waveguide. For this simulation, ideal AR coatings are applied where appropriate, ideal dichroic mirrors and color filters are utilized, and material dispersion is not included. In FIG. 6, green waveguide layer 505*g*, blue waveguide 505*b*, and red waveguide 505*r* are illustrated for ease of comparison with FIG. 5 and the ICGs are disposed on the surface of the waveguide layers farthest from pupil separation system 510. For this implementation, the dimensions of pupil separation system 510 are ~2.5 mm×4 mm×4 mm, the distance from the input surface 515 of pupil separation system 510 to the surface of pupil separation system 510 adjacent eyepiece waveguide 505 is 2.5 mm and the thickness of the waveguide layers is 0.5 mm, with a 50 µm space between adjacent waveguide layers. In other implementations, other dimensions are utilized.

Figure 7:
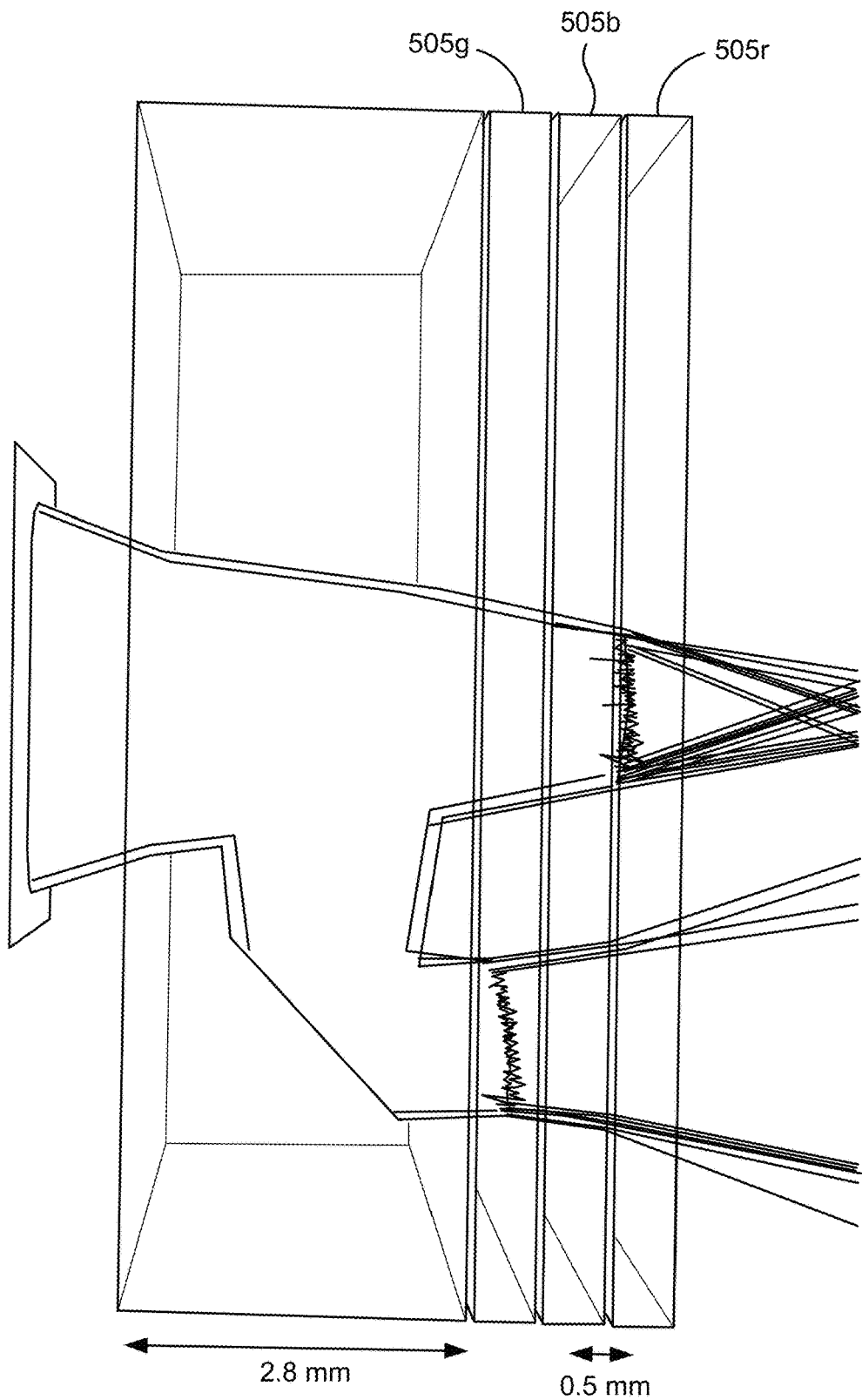
FIG. 7 is a simulation result demonstrating operation of the pupil separation system illustrated in FIG. 5 fabricated using a second material.

FIG. 7 is a simulation result demonstrating operation of the pupil separation system illustrated in FIG. 5 fabricated using a second material. In this simulation, the index of refraction of pupil separation system 510 is 2.5 and the leakage/uncaptured percentage of the light at the ICGs is ~1%. For this simulation, ideal AR coatings are applied where appropriate, ideal dichroic mirrors and color filters are utilized, and material dispersion is not included. For purposes of this simulation, dimensions as discussed in relation to FIG. 6 were utilized. In other implementations, other dimensions are utilized.

Figure 8:
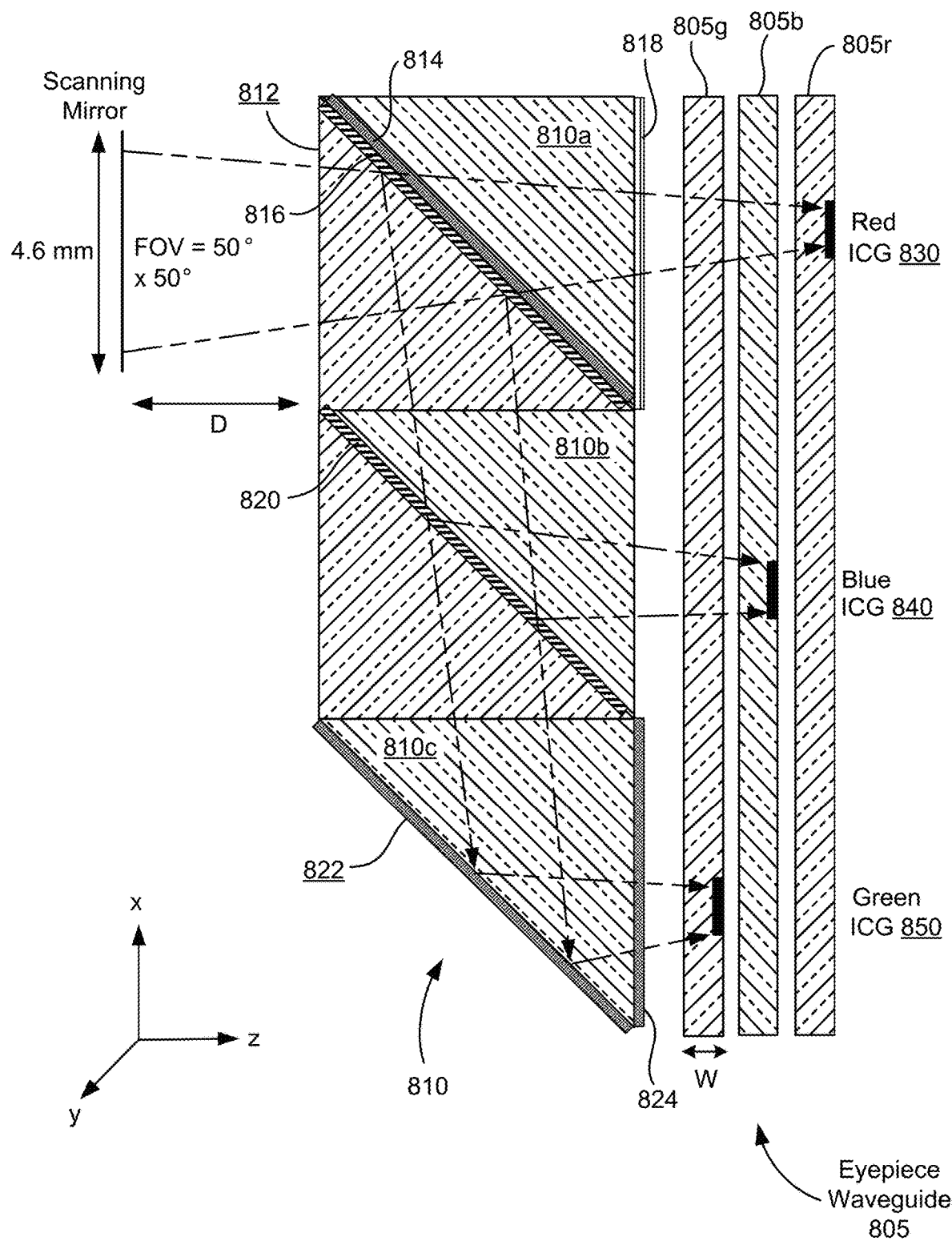
FIG. 8 is a simplified cross-sectional schematic diagram illustrating a pupil separation system for an eyepiece waveguide according to yet another embodiment of the present invention.

FIG. 8 is a simplified cross-sectional schematic diagram illustrating a pupil separation system for an eyepiece waveguide according to yet another embodiment of the present invention. The pupil separation system illustrated in FIG. 8 shares some common elements with the pupil separation systems shown in FIGS. 1 and 5 and the discussion provided in relation to FIGS. 1 and 5 is applicable to FIG. 8 as appropriate.

Referring to FIG. 8, three portions of pupil separation system 810 are illustrated as disposed along the x-axis. First portion 810*a* includes input surface 812 and is implemented as a dichroic beamsplitter that transmits light in the red wavelength range and reflects light in the blue and green wavelength ranges. As illustrated in FIG. 8, first portion 810*a* includes a green dichroic mirror 814 and a blue dichroic mirror 816. In some embodiments, a single dichroic mirror (i.e., a high-pass filter) is utilized that reflects light at both blue and green wavelengths while transmitting light at red wavelengths. Second portion 810*b* is displaced along the x-axis with respect to first portion 810*a* and is implemented as a dichroic beamsplitter that transmits light in the green wavelength range and reflects light in the blue wavelength range. Thus, second portion 810*b* includes a blue dichroic mirror 820. Third portion 810*c* is displaced along the x-axis with respect to second portion 810*b* and is implemented as a right angle prism that reflects light in the green wavelength range. Thus, third portion 810*c* includes reflective surface 822, which can operate using TIR or be coated with a reflective coating such as a metallized coating.

Thus, light in the red wavelength range passes through first portion 810*a* and impinges on a red ICG 830 in red waveguide layer 805*r*, light in the blue wavelength range reflects from blue dichroic mirror 816 in first portion 810*a* and blue dichroic mirror 820 in second portion 810*b* and impinges on a blue ICG 840 in blue waveguide layer 805*b*, and light in the green wavelength range reflects from green dichroic mirror 814 in first portion 810*a*, passes through blue dichroic mirror 820 in second portion 810*b*, reflects from reflective surface 822 in third portion 810*c*, and impinges on a green ICG 850 in green waveguide layer 805*g*.

In order to reduce cross-talk between the ICGs that can result from spurious reflections at the dichroic mirrors, reflection from interfaces including surfaces of the waveguide layers, reflection from the ICGs, and the like, color filters can be utilized as illustrated in FIG. 8. In particular, red color filter 818 is positioned on the surface of first portion 810*a* of pupil separation system 810 adjacent eyepiece waveguide 805 to transmit light with red wavelengths and attenuate or block light outside the red wavelength band (i.e., green and blue wavelengths). Furthermore, green color filter 824 is positioned on the surface of third portion 810*c* of pupil separation system 810 adjacent eyepiece waveguide 805 to transmit light with green wavelengths and attenuate or block light outside the green wavelength band (i.e., red and blue wavelengths). Although not illustrated in FIG. 8, a blue color filter can be utilized in conjunction with second portion 810*b*. One of ordinary skill in the art would recognize many variations, modifications, and alternatives.

Figure 9:
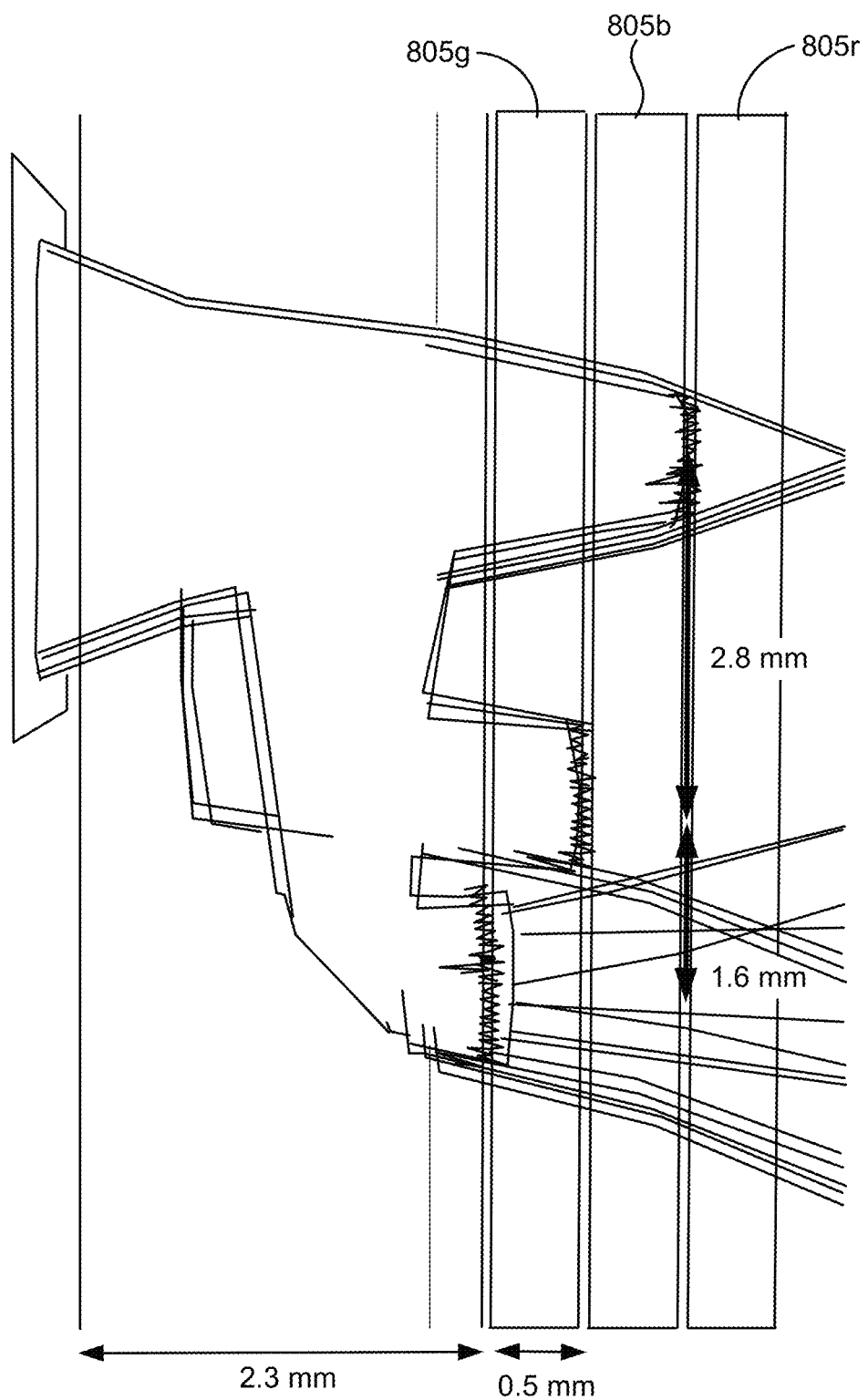
FIG. 9 is a simulation result demonstrating operation of the pupil separation system illustrated in FIG. 8.

FIG. 9 is a simulation result demonstrating operation of the pupil separation system illustrated in FIG. 8. In this simulation, the index of refraction of pupil separation system 810 is 2.5 and the leakage/uncaptured percentage of the light at the ICGs is ~2%. As shown in FIG. 9, uncaptured light for blue ICG 840 is significantly less than the uncaptured light for red ICG 830, which is less than the uncaptured light for green ICG 850 as indicated by the light rays propagating to the right through the eyepiece waveguide. For this simulation, ideal AR coatings are applied where appropriate, ideal dichroic mirrors and color filters are utilized, and material dispersion is not included. In FIG. 9, green waveguide layer 805*g*, blue waveguide 805*b*, and red waveguide 805*r* are illustrated for ease of comparison with FIG. 8 and the ICGs are disposed on the surface of the waveguide layers farthest from pupil separation system 810.

Figure 10:
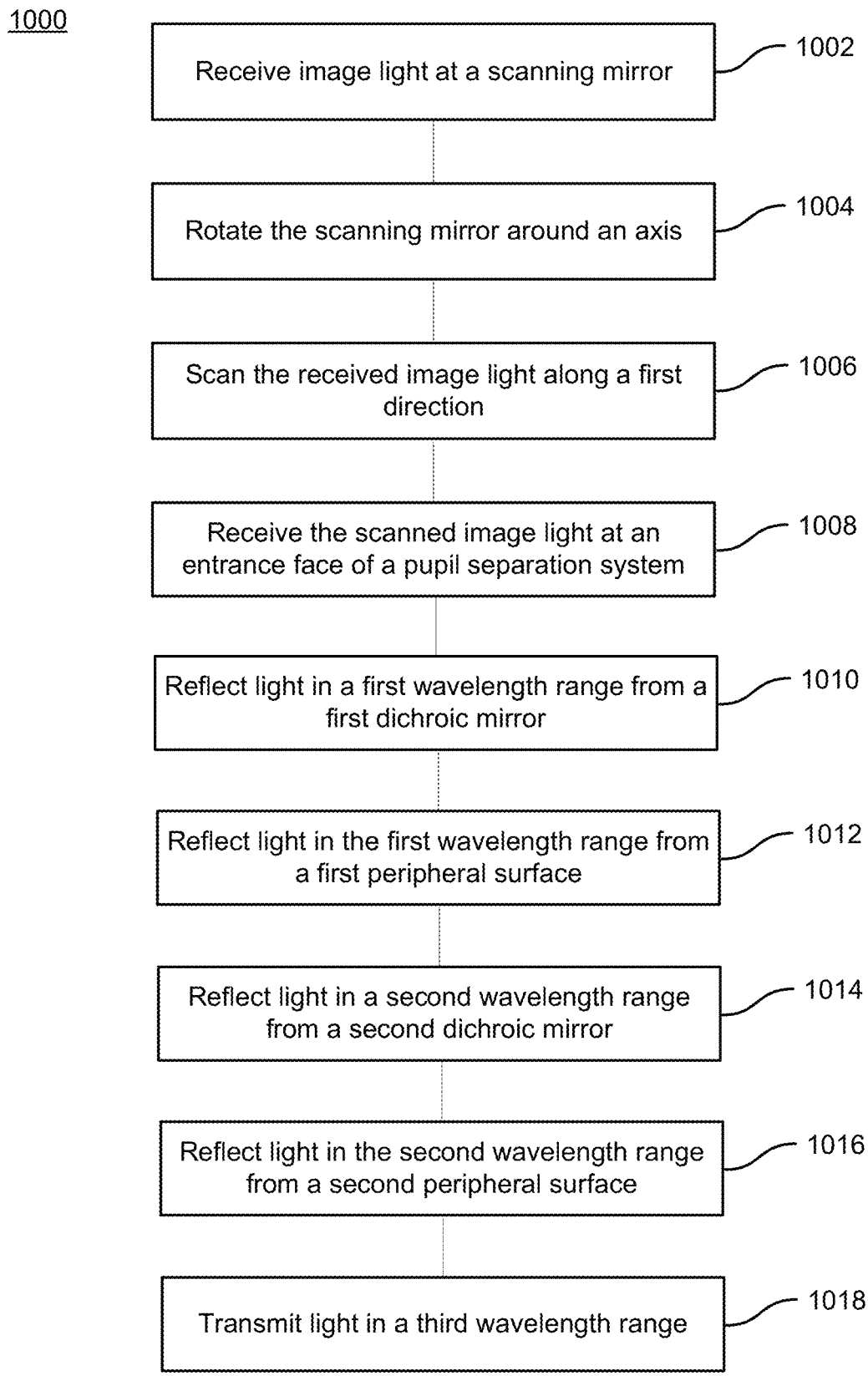
FIG. 10 is a simplified flowchart illustrating a method of operating a projector including a scanning mirror and an eyepiece waveguide according to an embodiment of the present invention.

FIG. 10 is a simplified flowchart illustrating a method of operating a projector including a scanning mirror and an eyepiece waveguide according to an embodiment of the present invention. The method 1000 includes receiving image light at a scanning mirror (1002). The image light is characterized by a first wavelength range, a second wavelength range, and a third wavelength range, for example, the primary colors red, green, and blue. The method also includes rotating the scanning mirror around an axis (1004), scanning the received image light along a first direction orthogonal to the axis (1006), and receiving the scanned image light at an input surface of a pupil separation system (1008).

The method further includes reflecting, from a first dichroic mirror of the pupil separation system, light in the first wavelength range (1010) and reflecting, from a first peripheral surface of the pupil separation system, light in the first wavelength range (1012). The first dichroic mirror and the second dichroic mirror can be orthogonal to each other and intersect at a line orthogonal to the axis. In some embodiments, the first dichroic mirror and the second dichroic mirror intersect at a line parallel to the input surface. The method also includes reflecting, from a second dichroic mirror of the pupil separation system, light in the second wavelength range (1014) and reflecting, from a second peripheral surface of the pupil separation system, light in the second wavelength range (1016). The method further includes transmitting light in the third wavelength range (1018).

In some embodiments, the waveguide projector includes an eyepiece waveguide including a plurality of waveguide layers and the light in the first wavelength range is incident on an incoupling grating of a first waveguide layer, the light in the second wavelength range is incident on an incoupling grating of a second waveguide layer, and the light in the third wavelength range is incident on an incoupling grating of a third waveguide layer. In some embodiments, the light in the first wavelength range is filtered using a first color filter coupled to the pupil separation system, the light in the second wavelength range is filtered using a second color filter coupled to the pupil separation system, and the light in the third wavelength range is filtered using a third color filter coupled to the pupil separation system.

It should be appreciated that the specific steps illustrated in FIG. 10 provide a particular method of operating a projector including a scanning mirror and an eyepiece waveguide according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
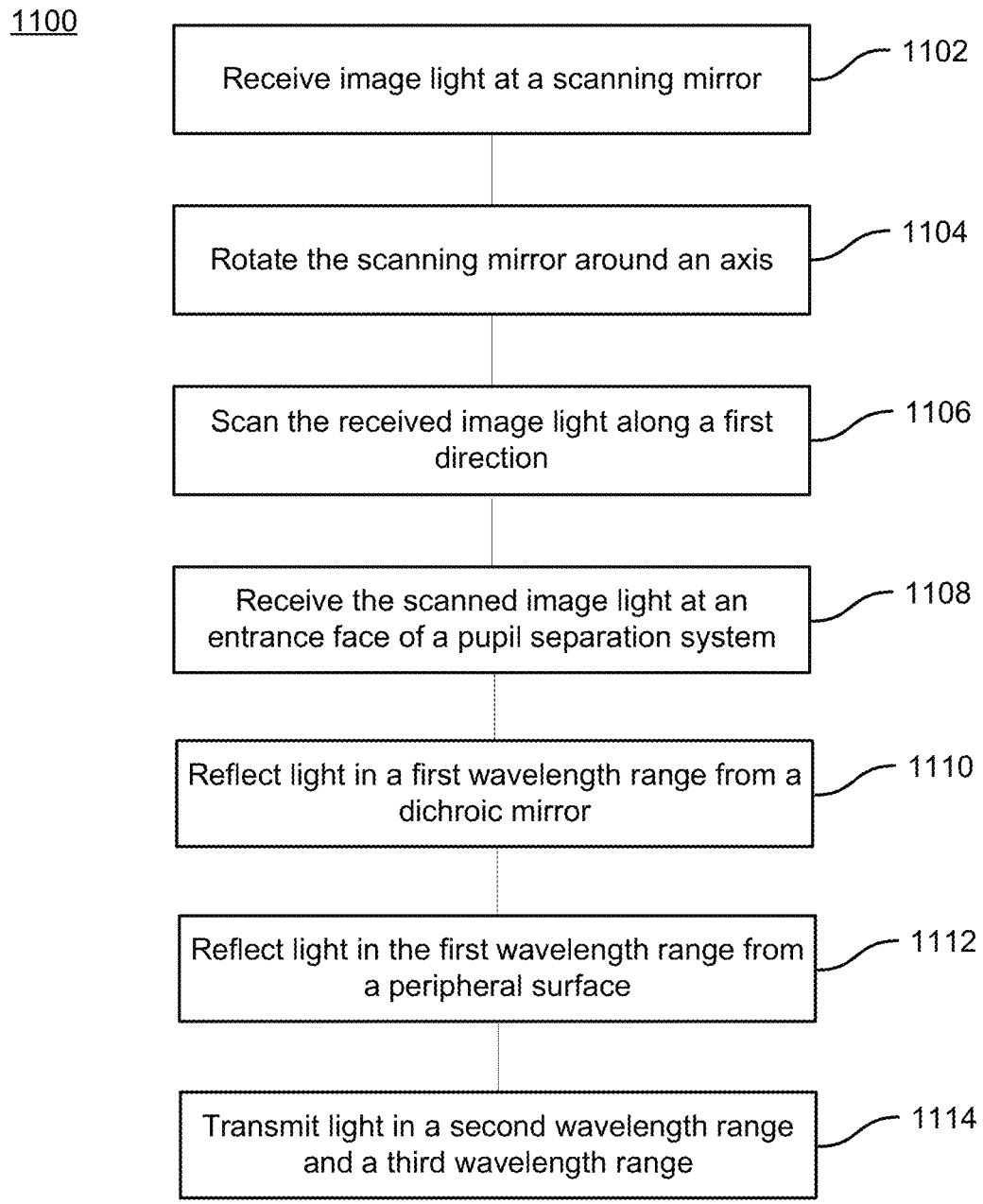
FIG. 11 is a simplified flowchart illustrating a method of operating a projector including a scanning mirror and an eyepiece waveguide according to an embodiment of the present invention.

FIG. 11 is a simplified flowchart illustrating a method of operating a projector including a scanning mirror and an eyepiece waveguide according to an embodiment of the present invention. The method 1100 includes receiving image light at a scanning mirror (1102). The image light is characterized by a first wavelength range, a second wavelength range, and a third wavelength range, for example, the primary colors red, green, and blue. The method also includes rotating the scanning mirror around an axis (1104), scanning the received image light along a first direction orthogonal to the axis (1106), and receiving the scanned image light at an input surface of a pupil separation system (1108).

The method further includes reflecting, from a dichroic mirror of the pupil separation system, light in a first wavelength range (1110) and reflecting, from a peripheral surface of the pupil separation system, light in the first wavelength range (1112). The dichroic mirror can be oriented at 45° to the input surface and the axes lying in the input surface and the dichroic mirror can be parallel. The method further includes transmitting light in a second wavelength range and the third wavelength range (1114).

In some embodiments, the waveguide projector includes an eyepiece waveguide including a plurality of waveguide layers and the light in the first wavelength range is incident on an incoupling grating of a first waveguide layer, the light in the second wavelength range is incident on an incoupling grating of a second waveguide layer, and the light in the third wavelength range is incident on an incoupling grating of a third waveguide layer. In some embodiments, the light in the first wavelength range is filtered using a first color filter coupled to the pupil separation system, the light in the second wavelength range is filtered using a second color filter coupled to the pupil separation system, and the light in the third wavelength range is filtered using a third color filter coupled to the pupil separation system.

It should be appreciated that the specific steps illustrated in FIG. 11 provide a particular method of operating a projector including a scanning mirror and an eyepiece waveguide according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
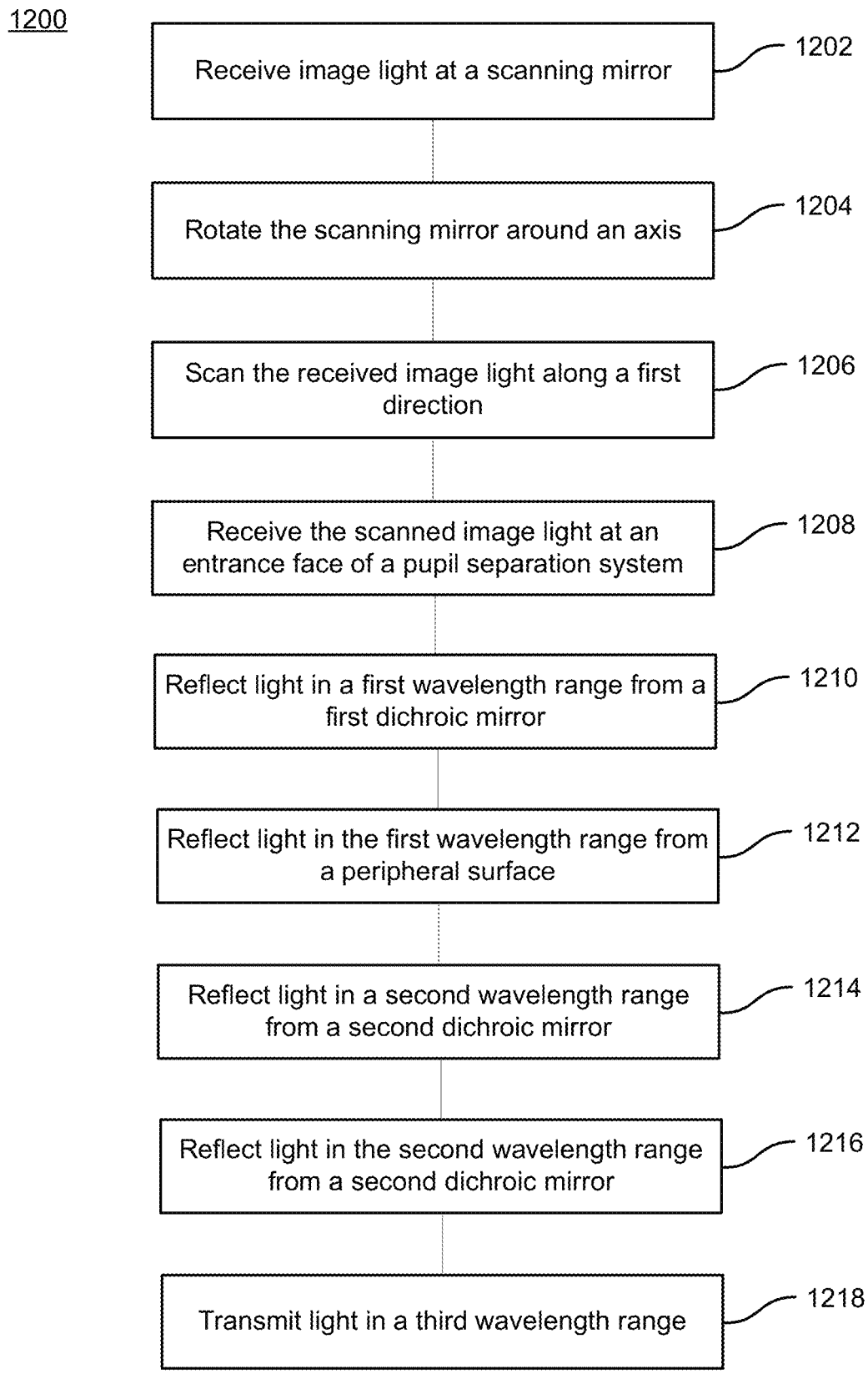
FIG. 12 is a simplified flowchart illustrating a method of operating a projector including a scanning mirror and an eyepiece waveguide according to an embodiment of the present invention.

FIG. 12 is a simplified flowchart illustrating a method of operating a projector including a scanning mirror and an eyepiece waveguide according to an embodiment of the present invention. The method 1200 includes receiving image light at a scanning mirror (1202). The image light is characterized by a first wavelength range, a second wavelength range, and a third wavelength range, for example, the primary colors red, green, and blue. The method also includes rotating the scanning mirror around an axis (1204), scanning the received image light along a first direction orthogonal to the axis (1206), and receiving the scanned image light at an input surface of a pupil separation system (1208).

The method further includes reflecting, from a first dichroic mirror of the pupil separation system, light in the first wavelength range (1210) and reflecting, from a peripheral surface of the pupil separation system, light in the first wavelength range (1212). The method also includes reflecting, from a second dichroic mirror of the pupil separation system, light in the second wavelength range (1214) and reflecting, from a second dichroic mirror of the pupil separation system, light in the second wavelength range (1216). The method further includes transmitting light in the third wavelength range (1218). The first dichroic mirror and the second dichroic mirror can be parallel to each other.

In some embodiments, the waveguide projector includes an eyepiece waveguide including a plurality of waveguide layers and the light in the first wavelength range is incident on an incoupling grating of a first waveguide layer, the light in the second wavelength range is incident on an incoupling grating of a second waveguide layer, and the light in the third wavelength range is incident on an incoupling grating of a third waveguide layer. In some embodiments, the light in the first wavelength range is filtered using a first color filter coupled to the pupil separation system, the light in the second wavelength range is filtered using a second color filter coupled to the pupil separation system, and the light in the third wavelength range is filtered using a third color filter coupled to the pupil separation system.

It should be appreciated that the specific steps illustrated in FIG. 12 provide a particular method of operating a projector including a scanning mirror and an eyepiece waveguide according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A pupil separation system comprising:
an input surface;
a central portion including a set of dichroic mirrors;
a first reflective surface disposed laterally with respect to the central portion;
a second reflective surface disposed laterally with respect to the central portion; and
an output surface including:
a central surface operable to transmit light in a first wavelength range;
a first peripheral surface adjacent the central surface and operable to transmit light in a second wavelength range, wherein the light in the second wavelength range is reflected by the set of dichroic mirrors before being reflected by the first reflective surface; and
a second peripheral surface adjacent the central surface and opposite to the first peripheral surface, wherein the second peripheral surface is operable to transmit light in a third wavelength range, wherein the light in the third wavelength range is reflected by the set of dichroic mirrors before being reflected by the second reflective surface.

2. The pupil separation system of claim 1 wherein the pupil separation system is characterized by an index of refraction greater than or equal to 2.0.

3. The pupil separation system of claim 2 wherein the index of refraction is ~2.5.

4. The pupil separation system of claim 1 wherein the set of dichroic mirrors comprises a first dichroic mirror oriented at 45° to the input surface and a second dichroic mirror oriented at −45° to the input surface.

5. The pupil separation system of claim 1 wherein the first wavelength range comprises a red wavelength range, the second wavelength range comprises a blue wavelength range, and the third wavelength range comprises a green wavelength range.

6. The pupil separation system of claim 5 further comprising:
a red color filter disposed on the central surface;
a blue color filter disposed on the first peripheral surface; and
a green color filter disposed on the second peripheral surface.

7. The pupil separation system of claim 1 wherein:
the first reflective surface is oriented at 45° to the input surface; and
the second reflective surface is oriented at −45° to the input surface.

8. The pupil separation system of claim 1 further comprising a reflective coating disposed on the first reflective surface and the second reflective surface.

9. The pupil separation system of claim 1 wherein the dichroic mirrors of the set of dichroic mirrors are orthogonal to each other and intersect.

10. The pupil separation system of claim 1 wherein the dichroic mirrors of the set of dichroic mirrors intersect along a line parallel to the input surface.

11. An optical system comprising:
a scanning mirror operable to rotate around an axis;
a pupil separation system comprising:
an input surface;
a central portion including a set of dichroic mirrors;
a first reflective surface disposed laterally with respect to the central portion; and
a second reflective surface disposed laterally with respect to the central portion;
an output surface including:
a central surface operable to transmit light in a first wavelength range;
a first peripheral surface adjacent the central surface and operable to transmit light in a second wavelength range; and
a second peripheral surface adjacent the central surface and opposite to the first peripheral surface, wherein the second peripheral surface is operable to transmit light in a third wavelength range;
an eyepiece waveguide including:
a first waveguide layer including a first incoupling grating (ICG) corresponding to the first wavelength range;
a second waveguide layer including a second ICG corresponding to the second wavelength range, wherein the second ICG is spatially offset from the first ICG; and
a third waveguide layer including a third ICG corresponding to the third wavelength range, wherein the third ICG is spatially offset from the first ICG and the second ICG.

12. The pupil separation system of claim 11 wherein the first ICG, the second ICG, and the third ICG are reflective ICGs.

13. The pupil separation system of claim 11 wherein the pupil separation system is characterized by an index of refraction greater than or equal to 2.0.

14. The pupil separation system of claim 13 wherein the index of refraction is ~2.5.

15. The pupil separation system of claim 11 wherein the set of dichroic mirrors comprises a first dichroic mirror oriented at 45° to the input surface and a second dichroic mirror oriented at −45° to the input surface.

16. The pupil separation system of claim 11 wherein the first wavelength range comprises a red wavelength range, the second wavelength range comprises a blue wavelength range, and the third wavelength range comprises a green wavelength range.

17. The pupil separation system of claim 16 further comprising:
a red color filter disposed on the central surface;
a blue color filter disposed on the first peripheral surface; and
a green color filter disposed on the second peripheral surface.

18. The pupil separation system of claim 11 wherein:
the first reflective surface is oriented at 45° to the input surface; and
the second reflective surface is oriented at −45° to the input surface.

19. The pupil separation system of claim 11 further comprising a reflective coating disposed on the first reflective surface and the second reflective surface.

20. The pupil separation system of claim 11 wherein the dichroic mirrors of the set of dichroic mirrors are orthogonal to each other and intersect along a line parallel to the axis.

* * * * *